(12) United States Patent
Knouse

(10) Patent No.: US 7,390,858 B2
(45) Date of Patent: Jun. 24, 2008

(54) COATING COMPOSITIONS AND METHODS

(75) Inventor: Donna Jean Knouse, Davenport, IA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 431 days.

(21) Appl. No.: 11/253,206

(22) Filed: Oct. 18, 2005

(65) Prior Publication Data

US 2007/0088102 A1    Apr. 19, 2007

(51) Int. Cl.
*B05D 3/02* (2006.01)
*C08L 33/14* (2006.01)
*C08L 63/02* (2006.01)
*C08L 63/08* (2006.01)

(52) U.S. Cl. ............... 525/438; 427/386; 523/427

(58) Field of Classification Search ............... None
See application file for complete search history.

(56) References Cited

U.S. PATENT DOCUMENTS

| 3,223,657 | A |   | 12/1965 | Weisfeld et al. |         |
|-----------|---|---|---------|-----------------|---------|
| 3,463,749 | A |   | 8/1969  | Taft            |         |
| 3,516,955 | A | * | 6/1970  | Taft            | 525/21  |
| 3,558,564 | A |   | 1/1971  | Vasta et al.    |         |
| 3,650,997 | A | * | 3/1972  | Weisfeld et al. | 525/514 |
| 3,792,011 | A | * | 2/1974  | Smith et al.    | 523/427 |
| 4,181,642 | A |   | 1/1980  | Hölle et al.    |         |
| 4,287,113 | A |   | 9/1981  | Takashina et al.|         |
| 4,439,560 | A |   | 3/1984  | Takashina et al.|         |
| 4,503,175 | A |   | 3/1985  | Houze et al.    |         |
| 4,555,535 | A |   | 11/1985 | Bednarek et al. |         |
| 5,428,088 | A |   | 6/1995  | Yamamoto et al. |         |
| 5,728,779 | A | * | 3/1998  | van de Werff et al. | 525/438 |
| 6,335,304 | B1| * | 1/2002  | He et al.       | 502/162 |

FOREIGN PATENT DOCUMENTS

| DE | 1494405     | A  | * | 3/1970  |
|----|-------------|----|---|---------|
| EP | 1 500 690   | A1 |   | 1/2005  |
| GB | 1 271 406   | A  |   | 4/1972  |
| JP | 59-217754   | A  | * | 12/1984 |
| JP | 2004-231929 | A  | * | 8/2004  |
| JP | 2004-250711 | A  | * | 9/2004  |
| SU | 401695      | A  | * | 2/1974  |
| WO | WO 01/37991 | A  |   | 5/2001  |

OTHER PUBLICATIONS

International Preliminary Report on Patentability for PCT/US2006/040062 (7 pgs).
Billmeyer, Fred W., Jr., *Textbook of Polymer Science*, Third Edition, (New York, Wiley-Interscience, Interscience, 1984), Title Page, Copyright Page, "Miscellaneous Thermosetting Resins," p. 451.
EPOTUF 607 Product Bulletin (Reichhold, Inc., Research Park, NC) Mar. 2004, [online], [retrieved on Mar. 21, 2006] Retrieved from the Reichhold Website using Internet <URL: http://www.reichhold.com/docs/bulletin/Epotuf%20607%20(15040-00).pdf>; 4 pgs.
EPOTUF 808-XD-71 Product Bulletin (Reichhold, Inc., Research Park, NC) Mar. 2004, [online], [retrieved on Mar. 21, 2006] Retrieved from the Reichhold Website using Internet <URL: http://www.reichhold.com/docs/bulletin/Epotuf%20808-XD-71%20(15039-00).pdf>; 3 pgs.
EPOTUF 607 Material Safety Data Sheet (Reichhold, Inc., Research Park, NC) Mar. 30, 2004, [online], [retrieved on Mar. 21, 2006] Retrieved from the Reichhold Website using Internet <URL: http://www.reichhold.com/docs/msds/EN6712.PDF>; 5 pgs.
EPOTUF 808-XD-71 Material Safety Data Sheet (Reichhold, Inc., Research Park, NC) May 20, 2004, [online], [retrieved on Mar. 21, 2006] Retrieved from the Reichhold Website using Internet <URL: http://www.reichhold.com/docs/msds/EN2959.PDF>; 8 pgs.
LAMCHEM OAP Material Safety Data Sheet (Lambent Technologies Corp., Skokie, IL), Apr. 22, 2002, [retrieved on Mar. 21, 2006] Retrieved from the Petroferm Website using Internet <URL: http://www.petroferm.com/static/files/lambent/msds/OAP.pdf>; 3 pgs.
EPOTUF 607 Material Safety Data Sheet (Reichhold, Inc., Research Park, NC) Mar. 30, 2004, [online], [retrieved on Mar. 21, 2006] Retrieved from the Reichhold Website using Internet <URL: http://www.reichhold.com/docs/msds/EN6712.PDF>: 5 pgs.
EPOTUF 808-XD-71 Material Safety Data Sheet (Reichhold, Inc., Research Park, NC) May 20, 2004, [online], [retrieved on Mar. 21, 2006] Retrieved from the Reichhold Website using Internet <URL:http://www.reichhold.com/docs/msds/EN2959.PDF>; 8 pgs.
Lamchem OAP Material Safety Data Sheet (Lambent Technologies Corp., Skokie, IL), Apr. 22, 2002, [retrieved on Mar. 21, 2006] Retrieved from the Petroferm Website Using Internet <URL:http://www.petroferm.com/static/files/lambent/msds/OAP.pdf>; 3 pgs.
Setalux 27-1435 Material Safety Data Sheet (Akzo Nobel Resins, Louisville, KY), Dec. 26, 2002; 5 pgs.

* cited by examiner

*Primary Examiner*—Robert Sellers
(74) *Attorney, Agent, or Firm*—Mueting, Raasch & Gebhardt, P.A.

(57) ABSTRACT

The present invention provides coating compositions that include an epoxy-modified fatty acid ester resin, an oxirane-functional resin different from the epoxy-modified fatty acid ester resin, a carboxyl functional polyester resin, and an alkyl acid phosphate.

29 Claims, No Drawings

COATING COMPOSITIONS AND METHODS

BACKGROUND

Various known coating compositions suffer from inferior performance in one or more areas such as durability, gloss retention, drying, hardness, solvent and humidity resistance, and the like. For example, two-component polyester epoxy resins systems have been developed and sold that include epoxy-modified fatty acid ester resins and carboxyl terminated polyesters. However, such combinations often suffer from several disadvantages including lack of durability, limited flexibility with increased hardness, and limited corrosion and chemical resistance.

Thus, there is a significant need for compositions in the coatings industry that have improved durability, flexibility, and chemical resistance.

SUMMARY

The present invention provides coating compositions that include an epoxy-modified fatty acid ester resin, an oxirane-functional resin that is different from the epoxy-modified fatty acid ester resin, a carboxyl functional polyester resin, and an alkyl acid phosphate. In certain embodiments, the coating composition is useful as a topcoat, whereas in other embodiments, the coating composition is useful as a primer. Compositions of the present invention can be provided in one or more parts, preferably, they are in two parts.

In certain embodiments, the epoxy-modified fatty acid ester resin is selected from the group consisting of epoxidized soybean oil, epoxidized tung oil, epoxidized linseed oil, octyl epoxytallate, epoxidized tall oil, and combinations thereof. In certain embodiments, the epoxy-modified fatty acid ester resin is preferably an epoxidized tall oil ester.

In certain embodiments, the oxirane-functional resin is an epoxy-functional acrylic resin or a phenolic polyglycidyl ether resin, or combinations thereof. Preferably, when the coating composition is a topcoat composition, the oxirane-functional resin is an epoxy-functional acrylic resin. Preferably, when the coating composition is a primer composition, the oxirane-functional resin is a phenolic polyglycidyl ether resin.

In certain embodiments, the epoxy-functional acrylic resin is preferably a polymer derived from epoxy-functional acrylate monomers selected from the group consisting of glycidyl acrylate, glycidyl methacrylate, beta-methylglycidyl acrylate, beta-methylglycidyl methacrylate, N-glycidyl acrylic acid amide, and combinations thereof, and optionally vinyl monomers selected from the group consisting of acrylic esters, fatty acids, styrene, substituted styrenes, and combinations thereof. In certain embodiments, the epoxy-functional acrylic resin is preferably a fatty acid-modified epoxy-functional acrylic resin.

In certain embodiments, the phenolic polyglycidyl ether resin is selected from the group consisting of $C_1$-$C_{28}$ alkyl-mono-phenol glycidyl ethers, $C_1$-$C_{28}$ alkyl-poly-phenol glycidyl ethers, pyrocatechol polyglycidyl ethers, resorcinol polyglycidyl ethers, hydroquinone polyglycidyl ethers, 4,4'-dihydroxydiphenyl methane polyglycidyl ethers, bisphenol F polyglycidyl ethers, 4,4'-dihydroxy-3,3'-dimethyldiphenyl methane polyglycidyl ethers, 4,4'-dihydroxydiphenyldimethyl methane polyglycidyl ethers, 4,4'-dihydroxydiphenylmethyl methane polyglycidyl ethers, 4,4'-dihydroxydiphenyl cyclohexane polyglycidyl ethers, 4,4'-dihydrox y-3,3'-dimethyldiphenyl propane polyglycidyl ethers, 4,4'-dihydroxydiphenylsulfone polyglycidyl ethers, tris(4-hydroxyphenyl) methane polyglycidyl ethers, novolac polyglycidyl ethers, diphenol polyglycidyl ethers, polyphenol polyglycidyl ethers, phenol novolac epoxy resins, cresol novolac epoxy resins, bisphenol A polyglycidyl ether resins, and combinations thereof. In certain embodiments, the phenolic polyglycidyl ether resin is preferably a bisphenol A polyglycidyl ether resin. In certain embodiments, the bisphenol A polyglycidyl ether resin is a polymer of 4,4'-(1-methylethylidene) bis-phenol with 2,2'-[(1-methylethylidene) bis (4,1-phenylene oxymethylene)] bis[oxirane].

In certain embodiments, the carboxyl functional polyester resin is selected from the group consisting of linear or branched, polyols and poly-functional carboxylic acids.

In certain embodiments, the alkyl acid phosphate has 1 to 12 carbon atoms in the alkyl group. In certain embodiments, the alkyl acid phosphate is a monoalkyl acid phosphate, or mixtures thereof, having an acid number of at least 4. In certain embodiments, the alkyl acid phosphate has an acid number of no greater than 500.

The present invention also provides methods for coating that involve applying the composition (e.g., primer or topcoat composition) to a substrate and preferably allowing the composition to harden. The present invention also provides coatings prepared or preparable from the compositions described herein. For example, a coating of the present invention is preparable by a method that involves applying a coating composition of the present invention to a substrate and preferably allowing the coating composition to harden. The resultant coating can be used as a primer or as a topcoat. In certain embodiments, a topcoat may be applied to an unhardened primer and the resulting two layers are allowed to harden.

Also herein, "a," "an," "the," "at least one," and "one or more" are used interchangeably.

Also herein, the recitations of numerical ranges by endpoints include all numbers subsumed within that range (e.g., 1 to 5 includes 1, 1.5, 2, 2.75, 3, 3.80, 4, 5, etc.).

Also herein, the terms "comprises" and variations thereof do not have a limiting meaning where these terms appear in the description and claims.

As used herein, the term "acrylic" means acrylic or methacrylic, and the term "acrylate" means acrylate or methacrylate, or any mixture or combination thereof.

As used herein, the term "oxirane-functional resin" refers to a resin that includes oxirane (i.e., epoxy) functionality.

As used herein, the term "epoxy-modified fatty acid ester resin" refers to a fatty acid resin that has been epoxidized.

As used herein, the term "phenolic polyglycidyl ether resin" refers to a polyether resin formed originally by the polymerization of phenolic compound(s) and epichlorohydrin.

As used herein, the term "epoxy-functional acrylic resin" refers to an acrylic resin that has been produced by polymerizing epoxy-functional acrylates alone or in combination with other vinyl monomers, including, for example, other acrylic esters, styrene, and substituted styrene, or has been modified to contain one or more epoxides.

As used herein, the term "carboxyl functional polyester resin" refers to a polyester resin that has been formed from polyols and poly-functional carboxylic acids, or from monomers having both hydroxyl and carboxylic acid functionality.

As used herein, the term "carboxyl functional polyester resin" refers to a polyester resin that has been formed from polyols and poly-functional carboxylic acids, or from monomers having both hydroxyl and carboxylic acid functionality.

As used herein, the term "alkyl acid phosphate" refers to a monoalkyl acid phosphate generally prepared from the reaction of phosphorus pentoxide with an alkyl alcohol.

As used herein, the term "primer" refers to a prefinishing coat applied to surfaces that are to be painted or otherwise finished.

As used herein, the term "topcoat" refers to a finishing coat applied to primed or unprimed surfaces.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Coating compositions of the present invention preferably include an epoxy-modified fatty acid ester resin, an oxirane-functional resin that is different from the epoxy-modified fatty acid ester resin, a carboxyl functional polyester resin, and an alkyl acid phosphate. The compositions are typically provided in a multiple-part (preferably, two-part) form, although a one-part composition is feasible, e.g., if storage stability is not required. Preferably, the epoxy-modified fatty acid ester resin and the oxirane-functional resin are in one part (e.g., Component A) and the carboxyl functional polyester resin and alkyl acid phosphate are in the other part (e.g., Component B). Preferably, the alkyl acid phosphate is present in the part with the carboxyl functional polyester resin to enhance storage stability and reduce premature hardening.

An epoxy-modified fatty acid ester resin is preferably present in the compositions of the present invention in an amount suitable to provide reaction with the carboxyl functional polyester and the alkyl acid phosphate to form a hardened film. Typically, the epoxy-modified fatty acid ester resin provides relatively fast cure as well as desirable hardness, chemical resistance, and exterior gloss retention to the hardened film.

Preferably, an epoxy-modified fatty acid ester resin is present in the overall composition in an amount of at least 25 weight percent (wt-%, based on total weight of solids of the epoxy-modified fatty acid ester resin, the oxirane-functional resin, the carboxyl functional polyester resin, and the alkyl acid phosphate components in the overall composition), more preferably, at least 30 wt-%, even more preferably, at least 32 wt-%, even more preferably, at least 35 wt-%, even more preferably, at least 37 wt-%, and even more preferably, at least 40 wt-%. Preferably, an epoxy-modified fatty acid ester resin is present in the overall composition in an amount of no more than 60 wt-%, even more preferably, no more than 55 wt-%, even more preferably, no more than 53 wt-%, even more preferably, no more than 50 wt-%, even more preferably, no more than 48 wt-%, and even more preferably, no more than 45 wt-%.

Suitable epoxy-modified fatty acid ester resins may include, for example, at least one 1,2-epoxy group per molecule and may be based, for example, on aliphatic, cycloaliphatic, or aromatic backbones.

Suitable epoxy-modified fatty acid ester resins may have, for example, an epoxy equivalent weight of at least 60 atomic mass units (AMU), preferably an epoxy equivalent weight of at least 125 AMU, and more preferably an epoxy equivalent weight of at least 250 AMU. Suitable epoxy-modified fatty acid ester resins may have, for example, an epoxy equivalent weight of no greater than 4,000 AMU, preferably an epoxy equivalent weight of no greater than 2,000 AMU, and more preferably an epoxy equivalent weight of no greater than 1,000 AMU.

Suitable epoxy-modified fatty acid ester resins may have, for example, a number average molecular weight of at least 125 AMU, preferably a number average molecular weight of at least 250 AMU, and more preferably a number average molecular weight of at least 500 AMU. Suitable epoxy-modified fatty acid ester resins may have, for example, a number average molecular weight of no greater than 8,000 AMU, preferably a number average molecular weight of no greater than 4,000 AMU, and more preferably a number average molecular weight of no greater than 2,000 AMU.

Suitable epoxy-modified fatty acid ester resins for use in the present invention may include, for example, epoxidized oils, such as epoxidized soybean oil, epoxidized tung oil, epoxidized linseed oil, octyl epoxytallate, epoxidized tall oil, and the like. Examples of epoxy-modified fatty acid ester resins are those sold under the trade designations EPOTUF 607 (an epoxidized tall oil ester at 99.5% solids, formerly, AROFLINT 607, Reichhold Chemicals, Durham, N.C.), PARAPLEX G-60 epoxidized soybean oil (CP Hall, Chicago, Ill.), PARAPLEX G-62 (CP Hall, Chicago, Ill.), EDENOL D-81 (Cognis, Ambler, Pa.), EDONOL D-82 (Cognis, Ambler, Pa.), VIKOFLEX 7170 (Atofina Chemicals, Philadelphia, Pa.), LANKROFLEX E2114 (Akcros Chemicals, New Brunswick, N.J.), LANKROFLEX L epoxidized linseed oil (Akcros Chemicals, New Brunswick, N.J.), VIKOFLEX 4050 octyl epoxy ester (Atofina Chemicals, Philadelphia, Pa.), VIKOFLEX 5075 epoxized propylene glycol dioleate (Atofina Chemicals, Philadelphia, Pa.). A particularly preferred epoxy-modified fatty acid ester resin is an epoxidized tall oil ester.

Combinations of the above-described epoxy-modified fatty acid ester resins are also suitable for use in the present invention.

An oxirane-functional resin (other than the epoxy-modified fatty acid ester resin) is preferably present in the compositions of the present invention in an amount suitable to provide enhanced flexibility and durability.

Preferably, an oxirane-functional resin is present the overall composition in an amount of at least 5 weight percent (wt-%, based on total weight of solids of the epoxy-modified fatty acid ester resin, the oxirane-functional resin, the carboxyl functional polyester resin, and the alkyl acid phosphate components in the overall composition), more preferably, at least 8 wt-%, even more preferably, at least 9 wt-%, even more preferably, at least 10 wt-%, even more preferably, at least 12 wt-%, even more preferably, at least 13 wt-%, and even more preferably, at least 15 wt-%. Preferably, an oxirane-functional resin is present in the overall composition in an amount of no more than 25 wt-%, more preferably, no more than 20 wt-%, even more preferably, no more than 18 wt-%, and even more preferably, no more than 17 wt-%.

Suitable oxirane-functional resins for use in the present invention include, for example, epoxy-functional acrylic resins as well as phenolic polyglycidyl ether resins.

Suitable epoxy-functional acrylic resins may have, for example, an epoxy equivalent weight of at least 250 atomic mass units (AMU), preferably an epoxy equivalent weight of at least 400 AMU, and more preferably an epoxy equivalent weight of at least 500 AMU. Suitable epoxy-functional acrylic resins may have, for example, an epoxy equivalent weight of no greater than 10,000 AMU, preferably an epoxy equivalent weight of no greater than 5,000 AMU, and more preferably an epoxy equivalent weight of no greater than 2,000 AMU.

Suitable epoxy-functional acrylic resins may have, for example, a number average molecular weight of at least 500 AMU, preferably a number average molecular weight of at least 1,000 AMU, and more preferably a number average molecular weight of at least 1,500 AMU. Suitable epoxy-functional acrylic resins may have, for example, a number average molecular weight of no greater than 100,000 AMU, preferably a number average molecular weight of no greater than 50,000 AMU, and more preferably a number average molecular weight of no greater than 25,000 AMU.

Suitable epoxy-functional acrylic resins may be produced, for example, by polymerizing epoxy-functional acrylates alone or in combination with other vinyl monomers, including, for example, other acrylic esters, dehydrated castor oil fatty acids, styrene, substituted styrenes, and combinations thereof. Examples of epoxy-functional acrylate monomers include glycidyl acrylate, glycidyl methacrylate, beta-methylglycidyl acrylate, beta-methylglycidyl methacrylate, N-glycidyl acrylic acid amide, and combinations thereof, among which glycidyl acrylate and glycidyl methacrylate are preferred. Alternatively, an acrylic resin can be modified to contain one or more epoxides.

Suitable commercially available epoxy-functional acrylic resins may include, for example, those available under the trade designations FINECLAD A-244-A (Reichhold Chemicals Inc., Durham, N.C.), ALMATEX PD 7690 (Anderson Development Company, Adrian, Mich.), GMA 300 (Estron Chemical Inc., Calvert City, Ky.), SETALUX 27-1435 (Nuplex Resins, Louisville, Ky., a fatty acid-modified epoxy functional acrylic resin at 80% solids), CRYLCOAT 700 (Cytec Industries, West Patterson, N.J.), CHEMPOL 17-1637 and 17-0103 GMA functional acrylic resins (CCP, North Kansas City, Mo.). A particularly preferred epoxy-functional acrylic resin is a fatty acid-modified epoxy functional acrylic resin.

Combinations of the above-described epoxy-functional acrylic resins are also suitable for use in the present invention.

Suitable phenolic polyglycidyl ether resins may have, for example, an epoxy equivalent weight of at least 200 atomic mass units (AMU), preferably an epoxy equivalent weight of at least 300 AMU, and more preferably an epoxy equivalent weight of at least 400 AMU. Suitable phenolic polyglycidyl ether resins may have, for example, an epoxy equivalent weight of no greater than 2,000 AMU, preferably an epoxy equivalent weight of no greater than 3,000 AMU, and more preferably an epoxy equivalent weight of no greater than 4,000 AMU.

Suitable phenolic polyglycidyl ether resins may have, for example, a number average molecular weight of at least 400 AMU, preferably a number average molecular weight of at least 600 AMU, and more preferably a number average molecular weight of at least 800 AMU. Suitable phenolic polyglycidyl ether resins may have, for example, a number average molecular weight of no greater than 4,000 AMU, preferably a number average molecular weight of no greater than 6,000 AMU, and more preferably a number average molecular weight of no greater than 8,000 AMU.

Suitable phenolic polyglycidyl ether resins may include, for example, $C_1$-$C_{28}$ alkyl-mono-phenol glycidyl ethers, $C_1$-$C_{28}$ alkyl-poly-phenol glycidyl ethers, pyrocatechol polyglycidyl ethers, resorcinol polyglycidyl ethers, hydroquinone polyglycidyl ethers, 4,4'-dihydroxydiphenylmethane polyglycidyl ethers, bisphenol F polyglycidyl ethers, 4,4'-dihydroxy-3,3'-dimethyldiphenyl methane polyglycidyl ethers, 4,4'-dihydroxydiphenyldimethyl methane polyglycidyl ethers, bisphenol A polyglycidyl ethers, 4,4'-dihydroxydiphenylmethyl methane polyglycidyl ethers, 4,4'-dihydroxydiphenyl cyclohexane polyglycidyl ethers, 4,4'-dihydroxy-3,3'-dimethyidiphenylpropane polyglycidyl ethers, 4,4'-dihydroxydiphenylsulfone polyglycidyl ethers, tris(4-hydroxyphyenyl)methane polyglycidyl ethers, novolac polyglycidyl ethers, diphenol polyglycidyl ethers, polyphenolic polyglycidyl ethers, phenol novolac epoxy resins, cresol novolac epoxy resins, and bisphenol A polyglycidyl ether resins.

Suitable commercially available phenolic polyglycidyl ethers may include, for example, those bisphenol A polyglycidyl ether resins available under the trade designations EPON 828, EPON 1001 (e.g., EPON 1001-G-75, a polymer of 4,4'-(1-methylethylidene)bis-phenol with 2,2'-[(1-methylethylidene) bis(4,1-phenylene oxymethylene)] bis[oxirane] at 75% solids), EPON 1009, and EPON 1031 (Hexion Specialty Chemicals, Inc., Houston, Tex.), DER 331, DER 332, DER 334, and DER 542 (Dow Chemical Co., Midland, Mich.), GY285 (Ciba Specialty Chemicals, Tarrytown, N.Y.), and BREN-S (Nippon Kayaku, Tokyo, Japan). A particularly preferred material is a bisphenol A polyglycidyl ether resin (a polymer of 4,4'-(1-methylethylidene)bis-phenol with 2,2'-[(1-methylethylidene) bis(4,1-phenylene oxymethylene)] bis [oxirane]).

Combinations of the above-described phenolic polyglycidyl ether resins are also suitable for use in the present invention.

A carboxyl functional polyester resin is present in the compositions of the present invention in an amount suitable to provide reaction with the epoxy-modified fatty acid ester resin to form a hard film. The carboxyl functional polyester resin is believed to provide in preferred embodiments one or more property such as fast dry, hard cure, good adhesion, and good stain and chemical resistance.

Preferably, a carboxyl functional polyester resin is present the overall composition in an amount of at least 20 weight percent (wt-%, based on total weight of solids of the epoxy-modified fatty acid ester resin, the oxirane-functional resin, the carboxyl functional polyester resin, and the alkyl acid phosphate components in the overall composition), more preferably, at least 25 wt-%, even more preferably, at least 30 wt-%, even more preferably, at least 34 wt-%, even more preferably, at least 35 wt-%, and even more preferably, at least 36 wt-%. Preferably, a carboxyl functional polyester resin is present in the overall primer and topcoat compositions in an amount of no more than 60 wt-%, more preferably, no more than 55 wt-%, even more preferably, no more than 54 wt-%, even more preferably, no more than 50 wt-%, even more preferably, no more than 45 wt-%, even more preferably, no more than 42 wt-%, and even more preferably, no more than 40 wt-%.

Suitable carboxyl functional polyester resins useful in the present invention, may have, for example, a number average molecular weight of at least 500 AMU, preferably a number average molecular weight of at least 750 AMU, and more preferably a number average molecular weight of at least 1000 AMU. Suitable carboxyl functional polyester resins useful in the present invention, may have, for example, a number average molecular weight of no greater than 20,000 AMU, preferably a number average molecular weight of no greater than 10,000 AMU, and more preferably a number average molecular weight of no greater than 5,000 AMU.

Suitable carboxyl functional polyester resins may have, for example, an acid number of at least 10 milligram KOH/gram, preferably an acid number of at least 25 milligram KOH/gram, and more preferably an acid number of at least 50 milligram KOH/gram. Suitable carboxyl functional polyester resins may have, for example, an acid number of no greater than 200 milligram KOH/gram, preferably an acid number of no greater than 175 milligram KOH/gram, and more preferably an acid number of no greater than 150 milligram KOH/gram.

Suitable carboxyl functional polyester resins useful in the present invention may include, for example, linear or branched, polyols and poly-functional carboxylic acids (or monomers having both hydroxyl and carboxylic acid functionality). Preferably, the carboxyl functional polyester resin is oil free.

Suitable commercially available carboxyl functional polyester resins may include, for example, those available under the trade designations ALFTALAT AN 783 (Vianova Resins Ltd, Middlesex, United Kingdom), RUCOTE 911 (Bayer Corp., Columbus, Ga.), EPOTUF 252 and EPOTUF 808 (Reichhold Chemicals, Inc., Durham, N.C.).

Combinations of the above-described carboxyl functional polyester resins are also suitable for use in the present invention.

An alkyl acid phosphate is preferably present in the compositions of the present invention in an amount suitable to provide increased crosslink density for better durability, corrosion resistance, and hardness.

Preferably, an alkyl acid phosphate is present the overall composition in an amount of at least 0.5 weight percent (wt-%, based on total weight of solids of the epoxy-modified fatty acid ester resin, the oxirane-functional resin, the carboxyl functional polyester resin, and the alkyl acid phosphate components in the overall composition), more preferably, at least 1 wt-%, even more preferably, at least 1.2 wt-%, even more preferably, at least 1.3 wt-%, even more preferably, at least 1.4 wt-%, and even more preferably, at least 1.5 wt-%. Preferably, an alkyl acid phosphate is present in the overall primer and topcoat compositions in an amount of no more than 10 wt-%, more preferably, no more than 5 wt-%, even more preferably, no more than 2 wt-%, even more preferably, no more than 1.8 wt-%, and even more preferably, no more than 1.7 wt-%.

Suitable alkyl acid phosphates include those having 1 to 12 carbon atoms in the alkyl group. Suitable alkyl acid phosphates are monoalkyl acid phosphates or mixtures thereof and have an acid number of at least 4, and typically no greater than 500 milligrams KOH/gram. Examples include methyl acid phosphate, ethyl acid phosphate, propyl acid phosphate, isopropyl acid phosphate, isopropyl acid phosphate, pentyl acid phosphate, hexyl acid phosphate, 2-ethylhexyl acid phosphate, octyl acid phosphate, nonyl acid phosphate, decyl acid phosphate, lauryl acid phosphate, and butyl acid phosphate.

Suitable commercially available alkyl acid phosphates may include, for example, DE PHOS HP-739 (a complex phosphate ester in the acid form, DeForest Enterprises Inc., Boca Raton, Fla.), HOSTAPHAT 2122 (a phosphoric acid ester mixture, Clariant, Sulzbach, Germany), NOVEON 2063 (octyl acid phosphate, Lubrizol Corp., Wickliffe, Ohio), NACURE 4054 (alkyl acid phosphate, King Industries Inc., Norwalk, Conn.), PA 800 (2-ethylhexyl phosphoric acid ester, Lakeland Laboratories Ltd, Manchester, UK), CRC-685 (2-ethylhexyl phosphate, Capital Resin Corporation, Columbus, Ohio), CRAFOL AP-22 (2-ethylhexyl ester, Cognis Iberia SL, Barcelona, Spain), LAMCHEM OAP (2-ethylhexyl acid phosphate at 90% solids, Lambert Technologies Inc., Skokie, Ill.). A particularly preferred alkyl acid phosphate is 2-ethylhexyl acid phosphate, preferably with an acid number of 325 milligrams KOH/gram.

Combinations of the above-described alkyl acid phosphates are also suitable for use in the present invention.

Preferably, the epoxy-modified fatty acid ester resin and the carboxyl functional polyester may be present in the overall compositions in the relative proportion of at least 10:90, more preferably, at least 20:80, even more preferably, at least 25:75, even more preferably, at least 28:72, and even more preferably, at least 50:50. Preferably, the epoxy-modified fatty acid ester resin and the carboxyl functional polyester may be present in the overall compositions in the relative proportion no greater than 90:10, more preferably, no greater than 80:20, even more preferably, no greater than 75:25, even more preferably, no greater than 72:28, and even more preferably no greater than 53:47.

In one embodiment, the epoxy-modified fatty acid ester resin, the oxirane functional resin, the carboxyl functional polyester, and the alkyl acid phosphate may be combined into a single mixture before use.

Alternatively, and preferably, the compositions are preferably provided in a two-part system with the epoxy-modified fatty acid ester resin and the oxirane functional resin in one part, and the carboxyl functional polyester resin and alkyl acid phosphate in another part to enhance storage stability and reduce premature hardening.

In yet another embodiment, the epoxy-modified fatty acid ester resin, the oxirane-functional resin, the carboxyl functional polyester, and the alkyl acid phosphate may be in more than two parts.

Preferably, an epoxy-modified fatty acid ester resin is present in one part (e.g., Component A, preferably with an oxirane-functional resin) of a two-part system in an amount of at least 45 weight percent (wt-%, based on total weight of solids in, e.g., Component A), more preferably, at least 50 wt-%, even more preferably, at least 60 wt-%, even more preferably, at least 65 wt-%, and even more preferably, at least 70 wt-%. Preferably, an epoxy-modified fatty acid ester resin is present in one part (e.g., Component A, preferably with an oxirane-functional acrylic resin) of a two-part system in an amount of no more than 99 wt-%, more preferably, no more than 95 wt-%, even more preferably, no more than 90 wt-%, even more preferably, no more than 85 wt-%, even more preferably, no more than 80 wt-%, and even more preferably, no more than 75 wt-%.

Preferably, an oxirane-functional resin is present in one part (e.g., Component A, preferably with an epoxy-modified fatty acid ester resin) of a two-part system in an amount of at least 2 weight percent (wt-%, based on total weight of solids in, e.g., Component A), more preferably, at least 5 wt-%, even more preferably, at least 10 wt-%, even more preferably, at least 12 wt-%, even more preferably, at least 15 wt-%, even more preferably, at least 20 wt-%, and even more preferably, at least 25 wt-%. Preferably, an oxirane-functional resin is present in one part (e.g., Component A, preferably with an epoxy-modified fatty acid ester resin) of a two-part system in an amount of no more than 55 wt-%, more preferably, no more than 52 wt-%, even more preferably, no more than 50 wt-%, even more preferably, no more than 45 wt-%, even more preferably, no more than 40 wt-%, even more preferably, no more than 36 wt-%, even more preferably, no more than 35 wt-%, even more preferably, no more than 33 wt-%, even more preferably, no more than 30 wt-%, and even more preferably, no more than 28 wt-%.

Preferably, a carboxyl functional polyester resin is present in one part (e.g., Component B, preferably with an alkyl acid phosphate) of a two-part system in an amount of at least 86 weight percent (wt-%, based on total weight of solids in, e.g., Component B), more preferably, at least 90 wt-%, and even more preferably, at least 94 wt-%. Preferably, a carboxyl functional polyester resin is present in one part (e.g., Component B, preferably with an alkyl acid phosphate) of a two-part system in an amount of no more than 99.8 wt-%, more preferably, no more than 99.0 wt-%, and even more preferably, no more than 98 wt-%.

Preferably, an alkyl acid phosphate is present in one part (e.g., Component B, preferably with the carboxyl functional polyester resin) of a two-part system in an amount of at least 0.25 weight percent (wt-%, based on total weight of solids in, e.g., Component B), more preferably, at least 1.0 wt-%, and even more preferably, at least 2.0 wt-%. Preferably, an alkyl acid phosphate is present in one part (e.g., Component B, preferably with the carboxyl functional polyester resin) of a two-part system in an amount of no more than 14 wt-%, more preferably, no more than 10 wt-%, and even more preferably, no more than 6 wt-%.

One or more organic solvents may also be included in the compositions of the present invention. Examples of suitable solvents may include, for example, benzene, xylene, mineral spirits, naphtha, toluene, acetone, methyl ethyl ketone, methyl propyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, trimethylpentanediol mono-isobutyrate, ethylene glycol mono-octyl ether, diacetone alcohol, TEXANOL ester alcohol (Eastman Chemical Company, Kingsport, Tenn.), monopropylene Glycol Ethers and Acetates (e.g., DOWANOL PM, Dow Chemical Company, Midland, Mich.), butyl cellosolve, D-150 and D-100 (Dow Corning Company, Midland, Mich.), and the like. These solvents may also include reactive solvents, such as, for example, diallyl phthalate, SANTOLINK XI-100 polyglycidyl allyl ether (Monsanto Company, St. Louis, Mo.), and the like.

Preferably, solvents can make up at least 0.001% by weight of the total weight of each part of the compositions of the present invention (whether a primer or a topcoat composition). Preferably, solvents can make up no more than 60% by weight of the total weight of each part of the compositions. In certain embodiments, it is advantageous to include a small percentage (e.g., less than 10%) of a higher boiling solvent to reduce blister formation in the dried coating.

In certain embodiments, it is advantageous to include, for example, one or more additives in compositions of the present invention (whether a primer or a topcoat composition. The additives may be selected from the group consisting of dispersants, flow agents, defoamers, pigments, rheology modifiers, flatting agents, corrosion inhibitors, ultraviolet light absorbers and stabilizers, and combinations thereof.

In certain embodiments, it is advantageous to include one or more pigments in compositions of the present invention (whether a primer or a topcoat composition) when opaque, colored, pigmented or other visual characteristics are desired.

Suitable pigments may include, for example, black pigments, yellow pigments, orange pigments, brown pigments, red pigments, violet pigments, blue pigments, green pigments, fluorescent pigments, metal powder pigments, and polymer bond pigments. In addition, insoluble azo pigments, azolake pigments, condensed azo pigments, chelate azo pigments, phthalocyanine-based pigments, anthraquinone-based pigments, perylene and perynone-based pigments, thioindigo-based pigments, quinacridone-based pigments, dioxazine-based pigments, isoindolinone-based pigments, quinophthalone-based pigments, dyeing lake pigments, azine pigments, nitroso pigments, nitro pigments, natural pigments, inorganic pigments, carbon black and the like may also be used.

Suitable black pigments may include, for example, inorganic pigments such as carbon black (C.I. pigment black 7) such as furnace black, lamp black, acetylene black channel black, and the like, or organic black pigments such as Aniline Black (C.I. pigment black 1), and the like.

Suitable colored pigments may include, for example, yellow pigments such as C.I. pigment yellow 1 (Hanza Yellow G), 2, 3 (Hanza Yellow 10 G), 4, 5 (Hanza Yellow 5G), 6, 7, 10, 11, 12 (Disazo Yellow AAA), 13, 14, 16, 17, 24 (Flavanthrone Yellow), 55 (Disazo Yellow AAPT), 61, 65, 73, 74 (Fast Yellow 5GX), 81, 83 (Disazo Yellow HR), 93 (condensed azo yellow 3G), 94 (condensed azo yellow 6G), 95 (condensed azo yellow GR), 97 (Fast Yellow FGL), 99 (Anthraquinone), 100, 108 (Anthrapyrimidine Yellow), 109 (Isoindolinone Yellow 2GLT), 110 (Isoindolinone Yellow 3RLT), 117, 120 (Benzimidazolone Yellow H2G), 123 (Anthraquinone Yellow), 124, 128 (condensed azo yellow 8G), 129, 133, 138 (Quinophthalone Yellow), 139 (Isoindolinone Yellow), 147, 151 (Benzimidazolone Yellow H4G), 153 (Nickel Nitroso Yellow), 154 (Benzimidazolone Yellow H3G), 155, 156 (Benzimidazolone Yellow HLR), 167, 168, 172, 173 (Isoindolinone Yellow 6GL), and 180 (Benzimidazolone Yellow), Hostaperm Yellow, red pigments such as C.I. pigment red 1 (Para Red), 2, 3 (Toluidine Red), 4, 5 (ITR Red), 6, 7, 8, 9, 10, 11, 12, 14, 15, 16, 17, 18, 19, 21, 22, 23, 30, 31, 32, 37, 38 (Pyrazolone Red B), 40, 41, 42, 88 (Thioindigo Bordeaux), 112 (Naphthol Red FGR), 114 (Brilliant Carmine BS), 122 (Dimethyl Quinacridone), 123 (Perylene Vermillion), 144, 146, 149 (Perylene Scarlet), 150, 166, 168 (Anthanthrone Orange), 170 (Naphthol Red F3RK), 171 (Benzimidazolone Maroon HFM), 175 (Benzimidazolone Red HFT), 176 (Benzimidazolone HF3C), 177, 178 (Perylene Red), 179 (Perylene Maroon), 185 (Benzimidazolone Carmine HF4C), 187, 188, 189 (Perylene Red), 190 (Perylene Red), 194 (Perylene Red), 202 (Quinacridone Mazenta), 209 (Dichloroquinacridone Red), 214 (condensed Azo Red), 216, 219, 220 (Condensed Azo), 224 (Perylene Red), 242 (condensed Azo Scarlet), 245 (Naphthol Red), C.I. Pigment violet 19 (Quinacridone), 23 (Dioxazine Violet), 31, 32, 33, 36, 38, 43, and 50 blue pigments such as C.I. pigment blue 15, 15:1, 15:2, 15:3, 15:4, 15:6 (Phthalocyanine Blue), 16 (metal-free Phthalocyanine Blue), 17:1, 18 (Alkali Blue Toner), 19, 21, 22,25, 56, 60 (Threne Blue), 64 (Dichloroindanthrone Blue), 65 (Violanthrone), and 66 (Indigo), and additional colored pigments such as C.I. pigment orange 1, 2, 5, 7, 13, 14, 15, 16 (Valcan Orange), 24, 31 (condensed Azo Orange 4R), 34, 36 (Benzimidazolone Orange HL), 38, 40 (Pyranthrone Orange), 42 (isoindolinone Orange RLT), 43, 51, 60 (Benzimidazolone-based insoluble monoazo pigment), 62 (benzimidazone-based insoluble monoazo pigment), 63, C.I. pigment green 7 (Phthalocyanine Green), 10 (Green Gold), 36 (chlorinated phthalocyanine green), 34, 47 (Violanthrone Green), C.I. pigment brown 1, 2, 3, 5, 23 (condensed Azo Brown 5R), 25 (Benzimidazolone Brown HFR), 26 (Perylene Bordeaux), and 32 (Benzimidazolone Brown HFL). Other pigments include titanium dioxide, for example, TIONA 595 (Millenium Chemical Division, Lyondell Company, Houston, Tex.), and LANSCO 3017A (Lubrizol Corp., Wickliffe, Ohio), as well as Hostaperm Yellow (Clariant, Charlotte, N.C.), Irgazin Yellow 3RLTN (Ciba, Tarrytown, N.Y.), and YZ-1688 yellow iron oxide (Elementis, Hightstown, N.J.).

Preferably, such pigment(s) can make up at least 0.001% by weight of the total weight of a composition of the present invention (whether primer or topcoat compositions). Preferably, such pigment(s) can make up no more than 95% by weight of the total weight of a composition of the present invention. Preferably, one or more pigments are combined with the epoxy-modified fatty acid ester resin and the oxirane-functional resin in one part (e.g., Component A) of a two-part system.

Suitable extender pigments may also be used in the compositions of the present invention (whether a topcoat or a primer), including, for example, heavy calcium carbonate, clay, kaolin, talc, precipitated barium sulfate, barium carbonate, white carbon, diatomaceous earth, and the like, and combinations thereof.

Preferably, extender pigment(s) can make up at least 0.001% by weight of the total weight of a composition of the present invention. Preferably, extender pigment(s) can make up no more than 95% by weight of the total weight of a composition of the present invention. Preferably, one or more extender pigments are combined with the epoxy-modified fatty acid ester resin and the oxirane-functional resin in one part (e.g., Component A) of a two-part system.

In some embodiments, it is advantageous to include one or more dyes in the compositions (whether a topcoat or a primer). Suitable dyes may include, for example, black dyes, yellow dyes, orange dyes, brown dyes, red dyes, violet dyes, blue dyes, fluorescent dyes, polymer bond dyes, and combinations thereof.

Preferably, dye(s) may include a total amount of at least 0.001 weight percent (wt-%) of the total weight of a coating composition of the present invention. Preferably, dye(s) can make up no more than 95% weight percent (wt-%) of the total weight of a coating composition of the present invention. One or more dyes can be added to any part of a multi-part system (e.g., either part of a two-part system).

Coating compositions of the present invention (whether a primer or a topcoat composition) can also include, for example, a gloss control additive or an optical brightener, such as that commercially available under the trade designation UVITEX OB (Ciba Specialty Chemicals, Tarrytown, N.Y.), or combinations thereof.

Preferably, gloss control additive(s) or optical brightener(s) can make up at least 0.1% by weight of the total weight of a composition of the present invention. Preferably, gloss control additive(s) or optical brightener(s) can make up no more than 10% by weight of the total weight of a composition of the present invention. Preferably, one or more gloss control additives or optical brighteners are combined with the epoxy-modified fatty acid ester resin and the oxirane-functional resin in one part (e.g., Component A) of a two-part system.

In certain embodiments, it is advantageous to include one or more dispersants in coating compositions of the present invention (whether primer or topcoat). For example, a dispersant is typically used in conjunction with a pigment. Typical dispersants include, for example, polymer dispersants, anionic surfactants, cationic surfactants, amphoteric surfactants, nonionic surfactants, and the like. Suitable dispersants may include, for example, sodium bis(tridecyl) sulfosuccinate, di(2-ethylhexyl) sodium sulfosuccinate, sodium dihexylsulfosuccinate, sodium dicyclohexyl sulfosuccinate, diamyl sodium sulfosuccinate, sodium diisobutyl sulfosuccinate, disodium iso-decyl sulfosuccinate, disodium ethoxylated alcohol half ester of sulfosuccinic acid, disodium alkylamidopolyethoxy sulfosuccinate, lecithin soya yelkin Ts unbleached, tetra-sodium N-(1,2-dicarboxyethyl)-N-octadecyl sulfosuccinamate, di sodium N-octasulfosuccinamate, sulfated ethoxylated nonylphenol, 2-amino-2-methyl-1-propanol, and the like. Suitable commercially available dispersants include, for example, DISPERSBYK 110, 167, 182 (BYK Chemie, U.S.A., Wallingford, N.J.), and DISPERSE-AYD 1 (Elementis Specialties, Jersey City, N.J.). Various combinations of dispersants (e.g., lecithin soya yelkin Ts unbleached and NUOSPERSE 657) can be used if desired.

Preferably, dispersant(s) can make up at least 0.001% by weight of the total weight of a composition of the present invention. Preferably, dispersant(s) can make up no more than 30% by weight of the total weight of a composition of the present invention. Preferably, one or more dispersants are combined with one or more pigments, the epoxy-modified fatty acid ester resin, and the oxirane-functional resin in one part (e.g., Component A) of a two-part system.

In certain embodiments, it is advantageous to include one or more flow agents in coating compositions of the present invention (whether a topcoat or primer composition). Suitable flow agents include, for example, ethyl acrylate and 2-ethyl hexyl acrylate (MODAFLOW, Cytec Industries, West Patterson, N.J.), fluorohydrocarbons, polysiloxanes, acrylics, polyacrylics, acrylates, polyacrylates, silicones, and combinations thereof.

Preferably, flow agent(s) can make up at least 0.1% by weight of the total weight of a composition of the present invention. Preferably, flow agent(s) can make up no more than 10% by weight of the total weight of a composition of the present invention. Preferably, when pigments are used, the flow agents are combined with the pigments, the epoxy-modified fatty acid ester resin, and the oxirane-functional resin in one part (e.g., Component A) of a two-part system for ease of production.

In certain embodiments, it is advantageous to include one or more rheology modifiers in compositions of the present invention (whether a topcoat or a primer composition). Suitable rheology modifiers may include, for example, clays, such as laponite, bentonite, thickener grade silicas, commonly used gums, resins, exudates, animal rendering products and byproducts, such as gelatin or keratin, plant extracts, alginates, cellulose, galactomannans, bacterial products, homopolymers, copolymers, interpolymers, block polymers, and graft polymers, either crosslinked or substantially linear, derived from monomers known to those skilled in rheology modification such as (meth)acrylic acid homo- and copolymers. Suitable commercially available rheology modifiers may include, for example, SALCARE SC 81-82, 91-92, 95-96 (Ciba Specialty Chemicals Company, Tarrytown, N.Y.), TINOVIS ADM and GTC (Ciba Specialty Chemicals Company, Tarrytown, N.Y.), UCAR POLYPHOBE T-900-901, TR-115-117, 102, 106HE (Union Carbide Company, Bound Brook, N.J.), SUSPENO 201-MS, 201-NBA, 201-P, 201-J, 201-X, 202X (Stochem Specialty Chemicals, Univar Canada Ltd), IRGOGEL 905, 907, 2000 (Delta Chemicals, Greece). Various combinations of rheology modifiers (e.g., IRCOGEL 905 and SUSPENO 201-NBA) can be used if desired.

Preferably, rheology modifiers can make up at least 0.10% by weight of the total weight of a composition of the present invention. Preferably, rheology modifiers can make up no more than 10% by weight of the total weight of a composition of the present invention.

In certain embodiments, it is advantageous to include one or more flatting agents (i.e., flattner extenders) in compositions of the present invention (whether a topcoat or a primer composition). Suitable flatting agents may include, for example, calcium carbonate, talc, clay, silicic acid, silicates, asbestos, mica, minute hollow spheres (e.g. glass balloons, phenol resin balloons), SYLOID synthetic silica (Davison Chemical Division, Lake Charles, La.), HERCOFLAT polypropylene (Hercules Inc., Wilmington, DE), TALC MP 1250 (Josco Products, Austin, Tex.), and ZEOLEX synthetic silicate (J. M. Huber Corporation, Edison, N.J.), polyethylene, waxes, ethylene copolymers, polyamide, polytetrafluoroethylene, urea-formaldehydes, and combinations.

Preferably, flatting agents can make up at least 0.001% by weight of the total weight of a composition of the present invention. Preferably, flatting agents can make up no more than 90.0% by weight of the total weight of a composition of the present invention.

In certain embodiments, it is advantageous to include one or more corrosion inhibitors in compositions of the present invention (whether a topcoat or a primer composition). Suitable corrosion inhibitors may include, for example, dithiophosphates, metal sulfonates, metal phenate sulfides, fatty acids, acid phosphate esters, alkyl succinic acids, sodium nitrite, ammonium nitrite, magnesium nitrite, potassium nitrite, sodium benzoate, potassium benzoate, amine neutralized alkyl acid phosphates and nitroalkanes, amine neutralized alkyl acid phosphates and volatile amines, diethanolamides, amine borates, hydroxylamines, alkanolamines, amine carboxylates, zinc phosphate, and the like. Suitable commercially available corrosion inhibitors may include, for example, Rhodafac RS-410 (Rhodia-HPCII, Cransbury, N.J.), MAPROSYL 30 (Stepan Company, Northfield, Ill.), and SHIELDEX AC 5 (Pigmentan, Israel). Various combinations of corrosion inhibitors (e.g., zinc phosphate and SHIELDEX AC 5) can be used if desired.

Preferably, corrosion inhibitors can make up at least 0.001% by weight of the total weight of a composition of the present invention. Preferably, corrosion inhibitors can make up no more than 90.0% by weight of the total weight of a composition of the present invention.

In certain embodiments, it is advantageous to include one or more defoamers in compositions of the present invention (whether a topcoat or a primer composition). Suitable defoamers may include, for example, silicone-based and mineral oil-based defoamers, acetylenic defoamers, and the like. Suitable commercially available defoamers may include, for example, those available under the trade designations DC-150 (Dow Corning Company, Midland, Mich.), SILVET I-77, 720, 722, or 7002 (Union Carbide Company, Bound Brook, N.J.), BUBREAK (Buckman Laboratories Inc., Memphis, Tenn.), FOAMASTER and NOPCO (Henkel Corporation, Gulph Mills, Pa.), DREWPLUS (Ashland Chemical Company, Columbus, Ohio), TRYSOL and TROYKYD (Troy Chemical Corporation, Burton, Ohio), PATCO 845 (Patco Additives Division, American Ingredients Company, Kansas City, Mo.), and SAG (Union Carbide Corporation, Bound Brook, N.J.). Various combinations of defoamers can be used if desired.

Preferably, defoamer(s) can make up at least 0.1% by weight of the total weight of a composition of the present invention. Preferably, defoamer(s) can make up no more than 10% by weight of the total weight of a composition of the present invention. Preferably, when pigments are used, the defoamers are combined with the pigments, the epoxy-modified fatty acid ester resin, and the oxirane-functional resin in one part (e.g., Component A) of a two-part system for ease of production.

In certain embodiments, it is advantageous to include one or more ultraviolet light absorbers and light stabilizers in compositions of the present invention (whether a topcoat or a primer composition). Suitable ultraviolet light absorbers and stabilizers may include, for example, substituted benzophenone, substituted benzotriazoles, hindered amines, and hindered benzoates, available under the trade designation CYASORB UV (Cytec Industries, West Patterson, N.J.), diethyl-3-acetyl-4-hydroxy-benzyl-phosphonate, 4-dodecyloxy-2-hydroxy benzophenone, resorcinol monobenzoate, TINUVIN 123 decanedioic acid, bis(2,2,6,6-tetramethyl-1-(octyloxy)-4 piperidinyl) ester, TINUVIN 328 (2(2'-hydroxy-3',5'-di-tert-amylphenyl)benzotriazole), TINUVIN 900 (2-(3',5'-bis(1-methyl-1-phenylethyl)-2'-hydroxyphenyl)benzotriazole), TINUVIN 1130 (poly (oxy-1,2-ethanediyl),α-[3-[3-(2H-benzotriazol-2-yl)-5-(1,1-dimethylethyl)-4-hydroxyphenyl]-1-oxopropyl]-ω-hydroxy-poly (oxy-1,2-ethanediyl), α-[3-[3-(2H -benzotriazol-2-yl)-5-(1, 1, dimethylethyl)-4-hydroxyphenyl)-1-oxopropyl-ω-[3-[3-(2H-benzotriazol-2-yl)-5-(1,1-dimethylethyl)-4-hydroxyphenyl]-1-oxopropoxy], TINUVIN 292 bis(1,2,2,6,6-pentamethyl-4-piperidinyl)sebacate and methyl(1,2,2,6,6-pentamethyl-4-piperidinyl)sebacate, TINUVIN 770 (bis(2,2,6,6-tetramethyl-4-piperidyl)sebacate), and TINUVIN 327 (2-(3',5'-di-tert-butyl-2'hydroxyphenyl)-5-chlorobenzotriazole) (Ciba Specialties Chemical Co., Tarrytown, N.Y.), SEESORB 102, 103, 110, 501, 202, 712, 704 (Shipro Kasai, Osaka, JP), and the like. Various ultraviolet light absorbers and/or light stabilizers can be used if desired.

Preferably, ultraviolet light absorber(s) and light stabilizer(s) can make up at least 0.1% by weight of the total weight of a composition of the present invention. Preferably, ultraviolet light absorber(s) and light stabilizer(s) can make up no more than 10% by weight of the total weight of a composition of the present invention. Preferably, one or more ultraviolet light absorbers and light stabilizers are combined with the epoxy-modified fatty acid ester resin and the oxirane-functional resin in one part (e.g., Component A) of a two-part system.

In certain embodiments, it is advantageous to include one or more fillers or inert ingredients in compositions of the present invention (whether a topcoat or a primer composition). Fillers and inert ingredients include, for example, clay, glass beads, calcium carbonate, talc, silica, organic fillers, and the like. Fillers extend, lower the cost of, alter the appearance of, or provide desirable characteristics to the primer and topcoat compositions before and after curing.

Suitable fillers are known to those of skill in the art or can be determined using standard methods. Preferably, filler(s) or inert ingredient(s) can make up at least 1% by weight of the total weight of a composition of the present invention. Preferably, filler(s) or inert ingredient(s) can make up no more than 90% by weight of the total weight of a composition of the present invention.

The invention may also include other ingredients that modify properties of the compositions for storage, handling, or application, and at other or subsequent stages. Waxes, mar and abrasion additives, and other similar performance enhancing additives may be employed in this invention as required in amounts effective to upgrade the performance of the cured coating and/or the primer and topcoat compositions. Desirable performance characteristics of the coating include chemical resistance, abrasion resistance, hardness, gloss, reflectivity, appearance, combinations of these characteristics, and other similar characteristics.

Coating compositions of the present invention may be applied to a variety of substrates including wood, cement, tile, metal, plastic, glass, optical fibers, and fiberglass. They can be applied to a substrate by a variety of methods known to those skilled in the art. Such methods include spraying, painting, roll coating, brushing, fan coating, curtain coating, spreading, air knife coating, die coating, vacuum coating, spin coating, electro-deposition, and dipping. The thickness of the coatings will vary with the application. Typically, the coatings will have a thickness of 0.1 to 20 mils, however, thicker or thinner coatings are also contemplated depending on, for example, the desired coating properties.

As stated above, coating compositions of the present invention can be used in a variety of applications. In particular, they may be used as topcoats or as primers. A topcoat composition of the present invention may be, for example, in some embodiments coated directly onto a suitable substrate, and in other embodiments, coated on a suitably primed substrate. When the coating composition is used as a primer, the primer may or may not be hardened prior to application of a topcoat composition.

Various preferred properties of a dry coated topcoat film (1.5-2.0 mil) are shown in Table 1. The test procedures are described in the TEST PROCEDURES Section.

TABLE 1

Topcoat Performance Properties

| Test Procedure | Preferred |
| --- | --- |
| VOC (lbs/gal) | 2.8-3.5 |
| #3 EZ Viscosity (sec) | 10-15" |
| Hardness Initial/after 7 days | >4 B/H-2 H |
| Gloss 60°/20° | 90+/80+ |
| 24 hour Diesel Oil Spot | None to Slight Discoloration |
| Chip Resistance # Chip Size | 0-20 A |
| # refers to number of chips and the A refers to the Chip size | (A = 1 mm or less) |
| ⅛ Inch Conical Mandrel (% Elongation) | 32% |
| Double Rub with MEK | 200+ |
| Reverse Impact/Direct Impact (lbs) | 10+/40+ |
| 168 hours Salt Spray | 0-3 mm |
| Water Immersion | 240-1000 Hours |
| Adhesion % | 100% |
| Xenon Arc | 1000-1500 Hours |
| Xenon Arc Final Gloss 60°/20° | 75+/50+ |
| Xenon Arc Color Change Δ E | <7 color change |
| 9 Month Florida Weathering | |
| Gloss 60°/20° | 75+/50+ |
| Δ E | <7 color change |

Preferably, in a topcoat, an epoxy-modified fatty acid ester resin is present in one part (e.g., Component A, preferably with an epoxy-functional acrylic resin) of a two-part topcoat system in an amount of at least 65 weight percent (wt-%, based on total weight of solids in, e.g., Component A), more preferably, at least 67 wt-%, even more preferably, at least 70 wt-%. Preferably, an epoxy-modified fatty acid ester resin is present in one part (e.g., Component A, preferably with an epoxy-functional acrylic resin) of a two-part topcoat system in an amount of no more than 95 wt-%, more preferably, no more than 85 wt-%, and even more preferably, no more than 75 wt-%.

If the coating compositions of the present invention are intended for use as topcoats (e.g., paints), the oxirane-functional resin is preferably an epoxy-functional acrylic resin, which is present in the topcoat composition in an amount suitable to provide, for example, good exterior durability, and flexibility.

Preferably, an epoxy-functional acrylic resin is present the overall topcoat composition in an amount of at least 12 weight percent (wt-%, based on total weight of solids of the epoxy-modified fatty acid ester resin, the oxirane-functional resin, the carboxyl functional polyester resin, and the alkyl acid phosphate components in the overall composition), more preferably, at least 13 wt-%, and even more preferably, at least 15 wt-%. Preferably, an epoxy-functional acrylic resin is present in the overall topcoat composition in an amount of no more than 20 wt-%, more preferably, no more than 18 wt-%, and even more preferably, no more than 17 wt-%.

Preferably, an epoxy-functional acrylic resin is present in one part (e.g., Component A, preferably with an epoxy-modified fatty acid ester resin) of a two-part topcoat system in an amount of at least 5 weight percent (wt-%, based on total weight of solids in, e.g., Component A), more preferably at least 15 wt-%, and even more preferably, at least 25 wt-%. Preferably, an epoxy-functional acrylic resin is present in one part (e.g., Component A, preferably with an epoxy-modified fatty acid ester resin) of a two-part topcoat system in an amount of no more than 35 wt-%, more preferably, no more than 33 wt-%, and even more preferably, no more than 30 wt-%.

Other components can be used in the topcoat in amounts as discussed above.

Various preferred properties of a dry coated primer film (1.5-2.0 mils) are shown in Table 2. The test procedures are described in the TEST PROCEDURES Section.

TABLE 2

Primer Performance Properties

| Test Procedure | Preferred |
| --- | --- |
| VOC (lbs/gal) | 2.8-3.5 |
| #3 EZ Viscosity (sec) | 15-20" |
| Hardness Initial/after 7 days | >4 B/H-2 H |
| Gloss 60° | 5.0+ |
| ⅛ Inch Conical Mandrel (% Elongation) | 32% |
| Double Rub with MEK | 50+ |
| Reverse Impact/Direct Impact (lbs) | 5+/10+ |
| 500 hours Salt Spray | 0-2 mm |

Preferably, in a primer, an epoxy-modified fatty acid ester resin is present in one part (e.g., Component A, preferably with phenolic polyglycidyl ether resin) of a two-part primer system in an amount of at least 48 weight percent (wt-%, based on total weight of solids in, e.g., Component A), more preferably, at least 64 wt-%, even more preferably, at least 72 wt-%. Preferably, an epoxy-modified fatty acid ester resin is present in one part (e.g., Component A, preferably with a phenolic polyglycidyl ether resin) of a two-part primer system in an amount of no more than 99 wt-%, more preferably, no more than 88 wt-%, and even more preferably, no more than 80 wt-%.

If the coating compositions of the present invention are intended for use as primer, the oxirane-functional resin is preferably a phenolic polyglycidyl ether resin, which is present in the primer composition in an amount suitable to provide, for example, good corrosion resistance.

Preferably, a phenolic polyglycidyl ether resin is present the overall primer composition in an amount of at least 5 weight percent (wt-%, based on total weight of solids of the epoxy-modified fatty acid ester resin, the oxirane-functional resin, the carboxyl functional polyester resin, and the alkyl acid phosphate components in the overall composition), and more preferably, at least 12 wt-%, and even more preferably, at least 13 wt-%. Preferably, a phenolic polyglycidyl ether resin is present in the overall primer composition in an amount of no more than 25 wt-%, more preferably, no more than 18 wt-%, and even more preferably, no more than 17 wt-%.

Preferably, a phenolic polyglycidyl ether resin is present in one part (e.g., Component A, preferably with an epoxy-modified fatty acid ester resin) of a two-part primer system in an amount of at least 2 weight percent (wt-%, based on total weight of solids in, e.g., Component A), more preferably, at least 12 wt-%, even more preferably, at least 20 wt-%. Preferably, a phenolic polyglycidyl ether resin is present in one part (e.g., Component A, preferably with an epoxy-modified fatty acid ester resin) of a two-part primer system in an amount of no more than 52 wt-%, more preferably, no more than 36 wt-%, and even more preferably, no more than 28 wt-%.

Other components can be used in the topcoat in amounts as discussed above.

Test Procedures

ASTM test procedures used to evaluate the primer and topcoat coatings are listed in Table 3.

TABLE 3

| Test Procedure | ASTM Test Number |
|---|---|
| Volatile Organic Compounds (VOC) | D3960 |
| Hardness | D3363 |
| Gloss at 60°/20° | D523 |
| Chip Resistance | D3170 |
| Elongation on a Conical Mandrel | D522 |
| MEK Solvent Resistance | D4752 |
| Impact Resistance | D2794 |
| Salt Spray Resistance | B117 |
|  | D1654 |
| Water Immersion | D610 |
| Adhesion | D3359 |

The viscosities of the coatings can be determined by the flow time through a standard orifice using the EZ ZAHN method (Paul N. Gardner, Inc., Pompano Beach, Fla.).

The gloss resistance can be determined by exposing the coated panels for 1000 hours or approximately 1516 kilojoules/meter$^2$ in a Ci35A Xenon Weather-O-Meter (ATLAS Material Testing Technology LLC, Chicago, Ill.). Gloss resistance can be determined measuring the initial gloss of the coated panels, exposing the coated panels outdoors for 9 months at a Florida test site, and measuring the final gloss of the coated panels.

Objects and advantages of this invention are further illustrated by the following examples, but the particular materials and amounts thereof recited in these examples, as well as other conditions and details, should not be construed to unduly limit this invention.

EXAMPLES

Example 1

Preparation of a Topcoat

A. Preparation of the First-Part (i.e., Component A) of a Two-Part Topcoat System To a container is added a portion of an epoxy modified ester (e.g., 12.87 pounds), a solvent (6.54 pounds), and a dispersant (3.24 pounds). The combination is mixed for 5 minutes with a Cowles high-speed disperser at 700-1400 revolutions per minute (RPM). To the mixture is added with agitation, pigments (27.33 pounds) and an ultraviolet light stabilizer (0.50 pound).

This mill base is dispersed using a Cowles high-speed disperser for 30 minutes at speeds of 1400-1800 RPM. The resulting mill base typically has a viscosity of 70-90 Kreb's units (ku) at temperatures of 120-130° F. The mill base is then milled to a Hegman grind of 7.0+ with a horizontal mill.

To the mill base, under agitation of a Cowles high-speed disperser at 700-1400 RPM, is added the remainder of the epoxy ester (17.24 pounds), an epoxy-functional acrylic resin (14.2 pounds), solvent (17.78 pounds), and flow additives (0.3 pound). The mixture is mixed for 20 minutes and filtered through a 10-micron (μm) filter bag.

B. Preparation of the Second-Part (i.e., Component B) of a Two-Part Topcoat System To a separate container are added and stirred with Cowles high-speed disperser at 700-1400 RPM, a carboxyl functional polyester resin (38.94 pounds), solvent (5.30 pounds), and an alkyl acid phosphate (1.23 pounds).

The mixture is mixed for 20 minutes and filtered through a 10-micron (μm) filter bag.

C. Preparation and Application of a Two-Part Topcoat System

Component A is added to Component B under agitation of a low speed air mixer of 20-50 RPM. The resulting mixture is sprayed onto an ACT B-1000 P60 iron phosphate treated cold rolled polished steel panels (ACT Laboratories, Hillsdale, Mich.). The panels are air dried for 5 minutes and either air dried for 10 days or baked in a conventional oven 20 minutes at 180° F. Next, the panels are post cured for 7 days ambient temperature. The coated panels can be evaluated using the test procedures described herein above. Typical results are shown in Table 4.

TABLE 4

| Test Procedure | Ex. 1 |
|---|---|
| VOC in pounds per gallon (lbs/gal) | 2.8-3.5 |
| #3 EZ Viscosity (seconds (sec)) | 10-15" |
| Hardness Initial/After 7 Days | 2B/H |
| Gloss 60°/20° | 90+/80+ |
| 24 Hour Diesel Oil Spot | Pass/Slight Discolor |
| Chip Resistance # Chip Size | 8-20 A |
| ⅛" Conical Mandrel | Pass |
| Double Rub with MEK | 200+ |
| Reverse Impact/Direct Impact (lbs) | 10-20/40-60 |
| 168 Hours Salt Spray | 2-3 mm |
| Water Immersion | 240 Hours |
| Adhesion % | 100 |
| Xenon Arc | 1000 hours |
| Gloss 60°/20° | 75+/50+ |
| Δ E | <7.0 |
| 9 Month Florida | |
| Gloss 60°/20° | 75+/50+ |
| Δ E | <7.0 |

Example 2

Preparation of a Primer

A. Preparation of the First-Part (i.e., Component A) of a Two-Part Primer System.

To a container is added an epoxy modified ester (12.77 pounds), a solvent (4.47 pounds), and a dispersant (1.06 pounds). The combination is mixed for 5 minutes with a Cowles high-speed disperser at 700-1400 revolutions per minute (RPM). To the mixture is added a solvent (0.75 pound), pigment (21.28 pounds), two different dispersants (0.93 pound total), two different rheology modifiers (1.59 pounds total), flatting agent (5.85 pounds), and two different corrosion inhibitors (13.34 pounds total).

This mill base is dispersed using a Cowles high-speed disperser for 30 minutes at speeds of 1400-1800 RPM. The resulting mill base typically has a viscosity of 80-110 Kreb's units (ku) at temperatures of 120-130° F. The mill base is then milled to a Hegman grind of 6 with a horizontal mill.

To the mill base, under agitation of a Cowles high-speed disperser at 700-1400 RPM, is added a phenolic polyglycidyl ether resin (5.35 pounds), solvent (10.02 pounds), and flatting agent (3.75 pounds). The mixture is mixed for 20 minutes and filtered through a 50-micron (μm) filter bag.

B. Preparation of the Second-Part (i.e., Component B) of a Two-Part Primer System To a separate container are added and stirred with Cowles high-speed disperser at 700-1400 RPM, a carboxyl functional polyester resin (17.81 pounds), solvent (2.43 pounds), and an alkyl acid phosphate (0.565 pound).

The mixture is mixed for 20 minutes and filtered through a 10-micron (μm) filter bag.

C. Preparation and Application of a Two-Part Primer System

Component A is added to Component B under agitation of a low speed air mixer of 20-50 RPM. The resulting mixture is sprayed onto ACT B-1000 P60 iron phosphate treated cold rolled polished steel panels (ACT Laboratories, Hillsdale, Mich.). Typically, the panels are air dried for 5 minutes and either air dried for 10 days or baked in a conventional oven 20 minutes at 180° F. Next, the panels are post cured for 7 days ambient temperature. The coated panels can be evaluated using the test procedures described herein above. Typical results are shown in Table 5.

TABLE 5

| Substrate | Steel |
|---|---|
| VOC (lbs/gal) | 2.8-3.5 |
| Typical Mix Ratio | 3:1 by Volume |
| Viscosity (sec) | #3 EZ @ 77° F. 15-20" |
| Pot Life | 5-8 Hours to Double Viscosity (48+ hours to form solid) |
| Recoat Window | Infinite |
| Recommended Film Thickness | 1.5-2.0 mils |
| Gloss Range (60°/20°) | ≦70 on 60° |
| Pencil Hardness | H |
| Forward Impact | 100 lbs |
| Reverse Impact | 10 lbs |
| ⅛" Conical Mandrel | Pass |
| Adhesion | 100% Adhesion |
| Salt Spray DTM | 500 hours 0-2 mm scrape |
| Humidity Resistance | 1000 hours |
| Chemical Resistance | Average to Good |
| Recoat Adhesion | Good |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A coating composition comprising:
an epoxy-modified fatty acid ester resin;
an oxirane-functional resin different from the epoxy-modified fatty acid ester resin;
a carboxyl functional polyester resin; and
an alkyl acid phosphate.

2. The coating composition of claim 1 which is in two parts.

3. The coating composition of claim 1 wherein the epoxy-modified fatty acid ester resin is selected from the group consisting of epoxidized soybean oil, epoxidized tung oil, epoxidized linseed oil, octyl epoxytallate, epoxidized tall oil, and combinations thereof.

4. The coating composition of claim 3 wherein the epoxy-modified fatty acid ester resin is an epoxidized tall oil ester.

5. The coating composition of claim 1 wherein the epoxy-modified fatty acid ester resin is present in an amount of 25 to 60 weight percent, based on the total solids weight of the epoxy-modified fatty acid ester resin, the oxirane-functional resin, the carboxyl functional polyester resin, and the alkyl acid phosphate components.

6. The coating composition of claim 5 wherein the epoxy-modified fatty acid ester resin is present in an amount of 40 to 45 weight percent, based on the total solids weight of the epoxy-modified fatty acid ester resin, the oxirane-functional resin, the carboxyl functional polyester resin, and the alkyl acid phosphate components.

7. The coating composition of claim 1 wherein the oxirane-functional resin is an epoxy-functional acrylic resin.

8. The coating composition of claim 7 wherein the epoxy-functional acrylic resin is a polymer derived from epoxy-functional acrylate monomers selected from the group consisting of glycidyl acrylate, glycidyl methacrylate, beta-methylglycidyl acrylate, beta-methylglycidyl methacrylate, N-glycidyl acrylic acid amide, and combinations thereof, and optionally vinyl monomers selected from the group consisting of acrylic esters, fatty acids, styrene, substituted styrenes, and combinations thereof.

9. The coating composition of claim 7 wherein the epoxy-functional acrylic resin is a fatty acid-modified epoxy-functional acrylic resin.

10. The coating composition of claim 7 wherein the epoxy-functional acrylic resin is present in an amount of 5 to 25 weight percent, based on the total solids weight of the epoxy-modified fatty acid ester resin, the epoxy-functional acrylic resin, the carboxyl functional polyester resin, and the alkyl acid phosphate components.

11. The coating composition of claim 10 wherein the epoxy-functional acrylic resin is present in an amount of 15 to 17 weight percent, based on the total solids weight of the epoxy-modified fatty acid ester resin, the epoxy-functional acrylic resin, the carboxyl functional polyester resin, and the alkyl acid phosphate components.

12. The coating composition of claim 1 wherein the oxirane-functional resin is a phenolic polyglycidyl ether resin.

13. The coating composition of claim 12 wherein the phenolic polyglycidyl ether resin is selected from the group consisting of $C_1$-$C_{28}$ alkyl-mono-phenol glycidyl ethers, $C_1$-$C_{28}$ alkyl-poly-phenol glycidyl ethers, pyrocatechol polyglycidyl ethers, resorcinol polyglycidyl ethers, hydroquinone polyglycidyl ethers, 4,4'-dihydroxydiphenylmethane polyglycidyl ethers, bisphenol F polyglycidyl ethers, 4,4'-dihydroxy-3,3'-dimethyldiphenyl methane polyglycidyl ethers, 4,4'-dihydroxydiphenyldimethyl methane polyglycidyl ethers, 4,4'-dihydroxydiphenylmethyl methane polyglycidyl ethers, 4,4'-dihydroxydiphenyl cyclohexane polyglycidyl ethers, 4,4'-dihydroxy-3,3'-dimethyldiphenylpropane polyglycidyl ethers, 4,4'-dihydroxydiphenylsulfone polyglycidyl ethers, tris(4-hydroxyphyenyl)methane polyglycidyl ethers, novolac polyglycidyl ethers, diphenol polyglycidyl ethers, polyphenol polyglycidyl ethers, phenol novolac epoxy resins, cresol novolac epoxy resins, bisphenol A polyglycidyl ether resins, and combinations thereof.

14. The coating composition of claim 13 wherein the phenolic polyglycidyl ether resin is a bisphenol A polyglycidyl ether resin.

15. The coating composition of claim 14 wherein the bisphenol A polyglycidyl ether resin is a polymer of 4,4'-(1-methylethylidene)bis-phenol with 2,2'-[(1-methylethylidene) bis (4,1-phenylene oxymethylene)] bis[oxirane].

16. The coating composition of claim 12 wherein the phenolic polyglycidyl ether resin is present in an amount of 5 to 25 weight percent, based on the total solids weight of the epoxy-modified fatty acid ester resin, the phenolic polyglycidyl ether resin, the carboxyl functional polyester resin, and the alkyl acid phosphate components.

17. The coating composition of claim 16 wherein the phenolic polyglycidyl ether resin is present in an amount of 12 to 18 weight percent, based on the total solids weight of the epoxy-modified fatty acid ester resin, the phenolic polyglycidyl ether resin, the carboxyl functional polyester resin, and the alkyl acid phosphate components.

18. The coating composition of claim 1 wherein the carboxyl functional polyester resin is selected from the group consisting of linear or branched, polyols and poly-functional carboxylic acids.

19. The coating composition of claim 1 wherein the carboxyl functional polyester resin is present in an amount of 20 to 60 weight percent, based on the total solids weight of the epoxy-modified fatty acid ester resin, the oxirane-functional resin, the carboxyl functional polyester resin, and the alkyl acid phosphate components.

20. The coating composition of claim 19 wherein the carboxyl functional polyester resin is present in an amount of 36 to 42 weight percent, based on the total solids weight of the epoxy-modified fatty acid ester resin, the oxirane-functional resin, the carboxyl functional polyester resin, and the alkyl acid phosphate components.

21. The coating composition of claim 1 wherein the alkyl acid phosphate has 1 to 12 carbon atoms in the alkyl group.

22. The coating composition of claim 21 wherein the alkyl acid phosphate is a monoalkyl acid phosphate, or mixtures thereof, having an acid number of at least 4.

23. The coating composition of claim 22 wherein the alkyl acid phosphate has an acid number of no greater than 500.

24. The coating composition of claim 23 wherein the alkyl acid phosphate is 2-ethylhexyl acid phosphate.

25. The coating composition of claim 1 wherein the alkyl acid phosphate is present in an amount of 0.5 to 10 weight percent, based on the total solids weight of the epoxy-modified fatty acid ester resin, the oxirane-functional resin, the carboxyl functional polyester resin, and the alkyl acid phosphate components.

26. The coating composition of claim 25 wherein the alkyl acid phosphate is present in an amount of 1.2 to 2.0 weight percent, based on the total solids weight of the epoxy-modified fatty acid ester resin, the oxirane-functional resin, the carboxyl functional polyester resin, and the alkyl acid phosphate components.

27. The coating composition of claim 1 further comprising additives selected from the group consisting of dispersants, flow agents, defoamers, pigments, rheology modifiers, flatting agents, corrosion inhibitors, ultraviolet light absorbers and stabilizers, and combinations thereof.

28. A method of coating, the method comprising applying a coating composition to a substrate wherein the coating composition comprises:
    an epoxy-modified fatty acid ester resin;
    an oxirane-functional resin different from the epoxy-modified fatty acid ester resin;
    a carboxyl functional polyester resin; and
    an alkyl acid phosphate.

29. A coating preparable by the method of claim 28.

* * * * *